No. 755,732. PATENTED MAR. 29, 1904.
R. E. BARKER.
ELECTRIC MOTOR.
APPLICATION FILED AUG. 7, 1903.
NO MODEL.
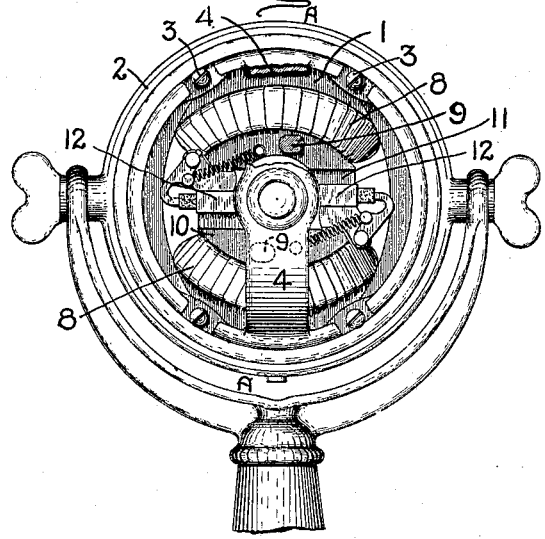
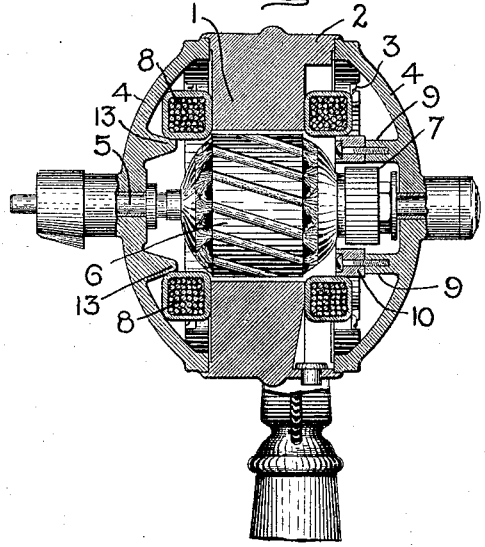
Witnesses
Erning R Gurney
Helen Orford
Inventor
Ralph E. Barker
By Albert G. Davis
Att'y.

No. 755,732. Patented March 29, 1904.

UNITED STATES PATENT OFFICE.

RALPH E. BARKER, OF LYNN, MASSACHUSETTS, ASSIGNOR TO GENERAL ELECTRIC COMPANY, A CORPORATION OF NEW YORK.

ELECTRIC MOTOR.

SPECIFICATION forming part of Letters Patent No. 755,732, dated March 29, 1904.

Application filed August 7, 1903. Serial No. 168,556. (No model.)

*To all whom it may concern:*

Be it known that I, RALPH E. BARKER, a citizen of the United States, residing at Lynn, county of Essex, State of Massachusetts, have invented certain new and useful Improvements in Electric Motors, of which the following is a specification.

This invention relates to the construction of dynamo-electric machines, and more particularly to small electric motors, such as those used to drive fans, in which simplicity and compactness are features of primary importance. In the design of these small motors special attention is given to reducing the size and number of the parts as much as is possible for a given output and arranging these parts to occupy a minimum space. In working toward these ends trouble has been experienced in securing the field-coils in place. It has been found that the coils sag and change their shape after considerable use, and unless some means is adopted for preventing or at least limiting this sagging it is apt to lead to very serious results. For instance, a portion of the coil not positively secured against movement may sag until it rubs against the armature, causing undue friction and resulting disastrously unless stopped immediately. It is therefore highly necessary that the coil be secured not only against movement of the whole coil on the pole-piece, but also against movement of a part of the coil relative to another part. I have therefore provided means by which a movement of the field-coils to a position of danger to the coils themselves or to the other parts of the motor is positively prevented, and at the same time I have succeeded in making the motor more compact and substantial. In these small motors it has been common heretofore to provide lugs on the inner side of one of the end shields of the frame on which is mounted a yoke, which supports the brush-holders. I have adopted this construction; but I make the lugs much longer, so that the brush-holder yoke mounted on them overhangs the armature slightly and projects far under the field-coils, and I shape the edge of this yoke so that it exactly corresponds to the portion of the field-coil which is directly over it. The yoke may be of such size that when the field-coils are in the proper position one side of each coil rests directly on the edges of the yoke. The coils are therefore securely held in position, and movement in dangerous proximity to the moving parts is impossible. With this construction the shaft and the commutator of the motor extend through a central opening in the yoke and between the lugs to which the yoke is secured, and the brush-holders are mounted on the side of the yoke which is farther from the armature, with the brushes bearing on the commutator. The parts of the motor therefore fit within one another, making a very compact structure. On the other end shield I form inwardly-extending webs, which support the opposite side of the field-coils in the same manner.

My invention therefore comprises an electric motor or similar electric machine in which parts supported on the end shields of the machine are interposed between the field-coils and armature to prevent movement of the coils on the pole-pieces. It also comprises such a device in which the brush-holder yoke is supported in position between the field-coils and the rotating members and the brush-holders are mounted on the side of the yoke which is farther from the armature. It also comprises other novel features of construction, which will be definitely indicated in the appended claims.

In the accompanying drawings, which illustrate an embodiment of my invention, Figure 1 is an end elevation of an electric motor constructed in accordance with my invention, broken away in part; and Fig. 2 is a view at right angles thereto, partly in elevation and partly in section on line A A of Fig. 1.

In the drawings I have shown the motor as arranged to drive a fan, and it is therefore trunnioned in arms extending upward from a suitable base; but it must be understood that the invention is applicable generally to motors or generators of any description. The pole-pieces 1 1 are cast integral with the cylindrical shell 2, which forms the frame of the motor, and secured to each side of this frame by screws 3 3 are the end shields 4 4. These end shields are circular bands, each having a diametrical arm, which is bored out centrally to form a bearing for the shaft 5, carrying the armature 6 and commutator 7. In Fig. 1 the upper part of the arm of the end shield is broken away to show the construction of the other parts. A sheet-metal end piece may be fastened over each shield to inclose the motor. The field-coils 8 8 fit over the pole-pieces, as shown in the drawings. The end shield 4 on the commutator side of the motor is formed with two inwardly-extending lugs 9 9, to which is secured a yoke 10, preferably of wood or other insulating material, having a large central opening, as shown in Fig. 2. The edges of this yoke, which face the field-coils, are curved to correspond to the shape of the field-coils, and when the coils are in the proper position they rest on the curved edges of the yoke. A wide groove 11 is cut in the side of yoke 10 farther from the armature 6 and runs throughout the length of the yoke, and light sheet-metal brush-holders 12 12 are secured to the yoke with the brushes in the groove. The parts are so proportioned that the yoke 10 extends well under the field-coils to prevent the sagging of any part of the coil bringing it into contact with the moving parts, and the brushes secured in the groove in the side of the yoke farther from the armature bear on the center of the commutator, which extends through the central opening in the yoke. This arrangement of the parts makes a very compact structure and renders the brushes and brush-holders easily accessible.

The arm of the end shield for the other side of the motor is provided with inwardly-extending lugs or curved webs 13 13, which form pockets with the pole-pieces and the arm of the shield, in which pockets the field-coils are securely held in position.

What I claim as new, and desire to secure by Letters Patent of the United States, is—

1. In a dynamo-electric machine, a frame, pole-pieces fixed thereto, field-coils for the pole-pieces, an armature, end shields secured to the frame, and means carried by the end shields for preventing movement of the field-coils in proximity to the armature.

2. In an electric motor, a frame, pole-pieces thereon, field-coils for the pole-pieces, an end shield secured to the frame, and means carried by the end shield for holding the field-coils in place.

3. In an electric motor, a frame, pole-pieces thereon, field-coils for the pole-pieces, end shields secured to the frame, and interior projections on each end shield for supporting a side of each field-coil.

4. In a dynamo-electric machine, a frame, pole-pieces thereon, field-coils for the pole-pieces, and a brush-holder yoke arranged to support the field-coils.

5. In an electric motor, a frame, pole-pieces fixed thereto, field-coils for the pole-pieces, an armature, an end shield, and a brush-holder yoke supported thereon and extending between the field-coils and the armature.

6. In a dynamo-electric machine, a frame, pole-pieces thereon, field-coils for the pole-pieces, and a brush-holder yoke having its edges corresponding in shape to the shape of the field-coils and arranged to support the field-coils.

7. In a dynamo-electric machine, a frame, an end shield, an armature, a brush-holder yoke supported on the end shield, and brushes mounted on the side of the yoke farther from the armature.

8. In an electric motor, a frame, a shaft, an armature carried thereby, an end shield formed with a bearing for the shaft, a brush-holder yoke supported on the end shield, said yoke having a central opening, a commutator mounted on the shaft and extending within the opening in the brush-holder yoke, and brushes mounted on the side of the yoke farther from the armature.

9. In a dynamo-electric machine, a frame, pole-pieces thereon, field-coils for the pole-pieces, an armature, a commutator, a brush-holder yoke mounted between the field-coils and the armature, and brushes mounted on the side of the yoke farther from the armature and bearing on the commutator.

In witness whereof I have hereunto set my hand this 4th day of August, 1903.

RALPH E. BARKER.

Witnesses:
   DUGALD McK. McKILLOP,
   CHATTIN BRADWAY.